US012585999B2

(12) United States Patent　　(10) Patent No.:　US 12,585,999 B2

Shaik et al.　　(45) Date of Patent:　Mar. 24, 2026

(54) METHOD AND SYSTEM FOR CALIBRATING MACHINE LEARNING MODELS IN FULLY HOMOMORPHIC ENCRYPTION APPLICATIONS

(71) Applicant: Tata Consultancy Services Limited, Mumbai (IN)

(72) Inventors: Imtiyazuddin Shaik, Hyderabad (IN); Sitarama Brahmam Gunturi, Hyderabad (IN); Phani Sai Uppu, Hyderabad (IN); Rajan Mindigal Alasingara Bhattachar, Bangalore (IN); Kanaka Mahalakshmi Pathivada, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 525 days.

(21) Appl. No.: 18/351,023

(22) Filed: Jul. 12, 2023

(65) Prior Publication Data

US 2024/0054401 A1　　Feb. 15, 2024

(30) Foreign Application Priority Data

Jul. 26, 2022　(IN) ............................ 202221042866

(51) Int. Cl.
　*G06N 20/00*　　(2019.01)
　*H04L 9/00*　　(2022.01)

(52) U.S. Cl.
　CPC ............. *G06N 20/00* (2019.01); *H04L 9/008* (2013.01)

(58) Field of Classification Search
　None
　See application file for complete search history.

(56) References Cited

U.S. PATENT DOCUMENTS 11,275,585 B2　3/2022　Vald et al.
2011/0295773 A1 *　12/2011　Fisher ................... G06F 16/904
　707/769

(Continued)

FOREIGN PATENT DOCUMENTS

KR　　102304992 B1　　9/2021

OTHER PUBLICATIONS

Junghyun Lee et al., "Precise Approximation of Convolutional Neural Networks for Homomorphically Encrypted Data," IEEE Access, 2023, vol. 11, IEEE, https://ieeexplore.ieee.org/document/10155408.

(Continued)

*Primary Examiner* — Chikaodili E Anyikire

(74) *Attorney, Agent, or Firm* — Finnegan, Henderson, Farabow, Garrett & Dunner, LLP

(57)　　ABSTRACT

The present disclosure provides a technique to evaluate encrypted Machine Learning (ML) models. Conventional methods are unable to provide a holistic approach to evaluate encrypted ML models. Initially, the system receives an encrypted ML model. The ML model can be an unencrypted ML model trained with encrypted data or an encrypted ML model trained with encrypted data, or an encrypted ML model trained with unencrypted data. Further, a plurality of evaluation functions pertaining to the ML model to be calibrated are identified using a pattern matching technique. Further, an approximated function is generated for each of the plurality of evaluation functions using a corresponding approximation technique. After generating a plurality of approximated functions, an Expected Calibration Error (ECE) value is computed based on the plurality of approximated functions. Finally, the ML model is calibrated based on the computed ECE value. The ML model is perfectly calibrated if the computed ECE value is equal to zero.

20 Claims, 3 Drawing Sheets

(56)          References Cited

U.S. PATENT DOCUMENTS

2020/0036511 A1      1/2020  Cheon et al.
2021/0216697 A1*    7/2021  Van Den Brink  ....  G06F 30/398
2022/0337390 A1    10/2022  Cheon et al.

OTHER PUBLICATIONS

Joon-Woo Lee et al. "Privacy-Preserving Machine Learning with Fully Homomorphic Encryption for Deep Neural Network," IEEE Access, 2022, IEEE, https://ieeexplore.ieee.org/stamp/stamp.jsp?arnumber=9734024.

* cited by examiner

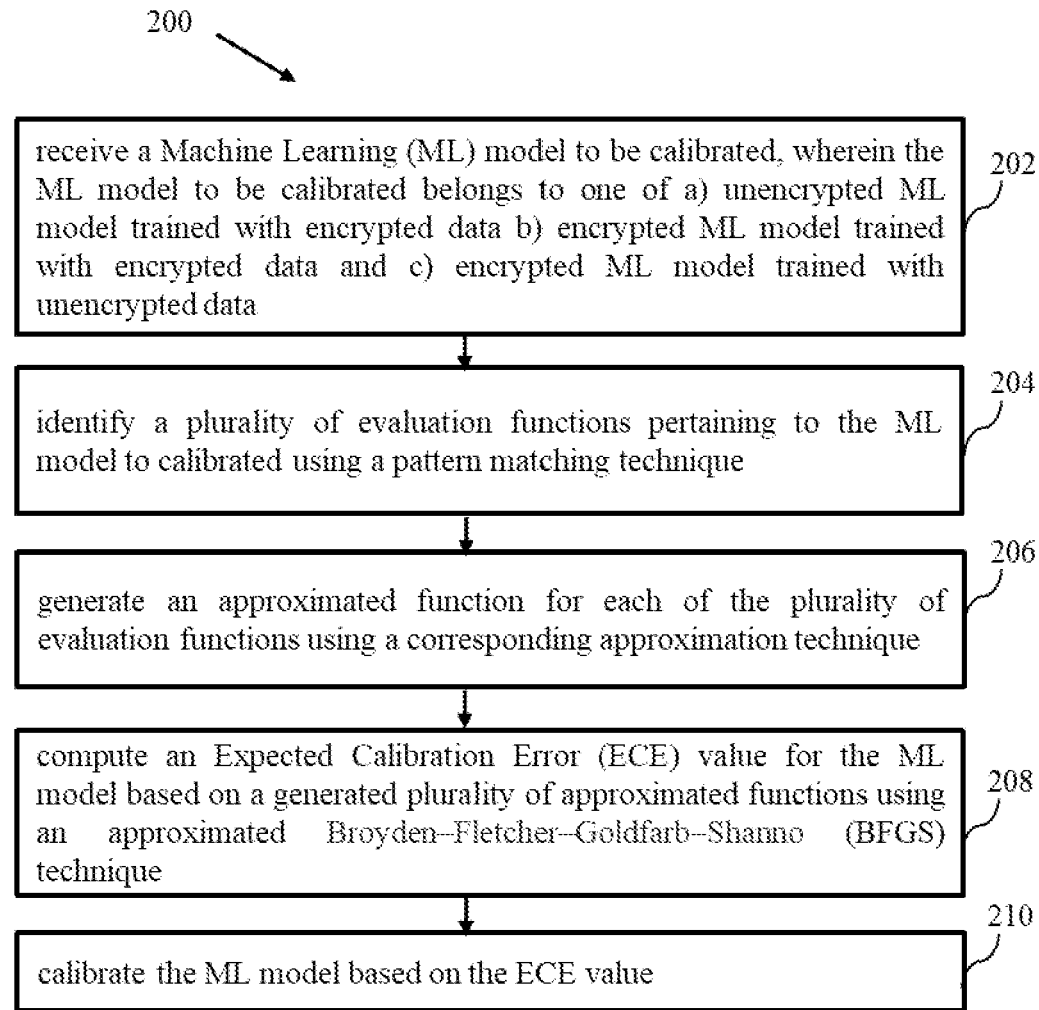

200 receive a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data          202 identify a plurality of evaluation functions pertaining to the ML model to calibrated using a pattern matching technique          204 generate an approximated function for each of the plurality of evaluation functions using a corresponding approximation technique          206 compute an Expected Calibration Error (ECE) value for the ML model based on a generated plurality of approximated functions using an approximated Broyden–Fletcher–Goldfarb–Shanno (BFGS) technique          208 calibrate the ML model based on the ECE value          210

FIG. 2

METHOD AND SYSTEM FOR CALIBRATING MACHINE LEARNING MODELS IN FULLY HOMOMORPHIC ENCRYPTION APPLICATIONS

PRIORITY CLAIM

This U.S. patent application claims priority under 35 U.S.C. § 119 to: India Application No. 202221042866, filed on Jul. 26, 2022. The entire contents of the aforementioned application are incorporated herein by reference.

TECHNICAL FIELD

The disclosure herein generally relates to the field of cyber security and, more particularly, to a method and system for calibrating Machine Learning (ML) models in Fully Homomorphic Encryption (FHE) applications.

BACKGROUND

Model calibration is a process of quantifying the quality of a system's predictions and evaluating Machine Learning (ML) models focuses on the overall performance of the model. Such calibrations include performance metrics and curves, and perhaps examples of incorrect predictions. Homomorphic encryption is one of the representative solutions to Privacy-Preserving Machine Learning (PPML) classification enabling the server to classify private data of clients while guaranteeing privacy. Calibrating a Fully Homomorphic Encryption (FHE) based ML model is challenging since either one of the ML model or the data used for training the ML model are in encrypted form. Generally, the evaluation of FHE based ML models are performed using approximated functions associated with the ML model.

Conventional methods are using approximated Rectified Linear Activation Unit (ReLU), max-pooling and similar other simpler functions for FHE based ML model inference. However, the conventional ReLU and max-pooling approximations are using low-degree polynomials. The low-degree polynomial based approximations are unable to support deeper neural networks due to large approximation errors. Some other conventional methods are focusing on approximation of branching statements. However, no conventional method is providing a holistic approach to calibrate FHE based ML models.

SUMMARY

Embodiments of the present disclosure present technological improvements as solutions to one or more of the above-mentioned technical problems recognized by the inventors in conventional systems. For example, in one embodiment, a method for calibrating Machine Learning (ML) models in Fully Homomorphic Encryption (FHE) applications is provided. The method includes receiving by one or more hardware processors, a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data. Further, the method includes identifying, by the one or more hardware processors, a plurality of evaluation functions pertaining to the ML model, to be calibrated, using a pattern matching technique. Furthermore, the method includes generating, by the one or more hardware processors, an approximated function for each of the plurality of evaluation functions using a corresponding approximation technique. Furthermore, the method includes computing, by the one or more hardware processors, an Expected Calibration Error (ECE) value for the ML model based on a generated plurality of approximated functions using an approximated Broyden-Fletcher-Goldfarb-Shanno (BFGS) technique. Finally, the method includes evaluating, by the one or more hardware processors, the ML model based on the ECE value.

In another aspect, a system for calibrating Machine Learning (ML) models in Fully Homomorphic Encryption (FHE) applications is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data. Further, the one or more hardware processors are configured by the programmed instructions to identify a plurality of evaluation functions pertaining to the ML model, to be calibrated, using a pattern matching technique. Furthermore, the one or more hardware processors are configured by the programmed instructions to generate an approximated function for each of the plurality of evaluation functions using a corresponding approximation technique. Furthermore, the one or more hardware processors are configured by the programmed instructions to compute an Expected Calibration Error (ECE) value for the ML model based on a generated plurality of approximated functions using an approximated Broyden-Fletcher-Goldfarb-Shanno (BFGS) technique. Finally, the one or more hardware processors are configured by the programmed instructions to evaluate the ML model based on the ECE value.

In yet another aspect, a computer program product including a non-transitory computer-readable medium having embodied therein a computer program for calibrating Machine Learning (ML) models in Fully Homomorphic Encryption (FHE) applications is provided. The computer readable program, when executed on a computing device, causes the computing device to receive a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data. Further, the computer readable program, when executed on a computing device, causes the computing device to identify a plurality of evaluation functions pertaining to the ML model, to be calibrated, using a pattern matching technique. Furthermore, the computer readable program, when executed on a computing device, causes the computing device to generate an approximated function for each of the plurality of evaluation functions using a corresponding approximation technique. Furthermore, computer readable program, when executed on a computing device, causes the computing device to compute an Expected Calibration Error (ECE) value for the ML model based on a generated plurality of approximated functions using an approximated Broyden-Fletcher-Goldfarb-Shanno (BFGS) technique. Finally, the computer readable program, when executed on a computing device, causes the computing device to evaluate the ML model based on the ECE value.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is an exemplary flow diagram illustrating a processor implemented method for calibrating ML models in FHE applications, implemented by the system of FIG. 1, in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Conventional methods are using approximated Rectified Linear Activation Unit (ReLU), max-pooling and similar simpler approximated functions for encrypted inference using Fully Homomorphic Encryption (FHE) based ML models. Further, the conventional ReLU and max-pooling approximations are using low-degree polynomials. The low-degree polynomial based approximation is unable to support deeper neural networks due to large approximation errors. Some other conventional methods are focusing on approximation of branching statements. However, no conventional method is providing a holistic approach to evaluate FHE based ML models.

Embodiments herein provide a method and system for calibrating Machine Learning (ML) models in Fully Homomorphic Encryption (FHE) applications. The present disclosure provides a mechanism to evaluate ML models in FHE environment. Initially, the system receives a Machine Learning (ML) model to be calibrated. The ML model to be calibrated can be either encrypted or unencrypted. Similarly, the inputs to the model can be either encrypted or unencrypted. The terms "calibration" and "evaluation" is used interchangeably throughout the document. Further, a plurality of evaluation functions pertaining to the ML model to be calibrated are identified using a pattern matching technique. Further, an approximated function is generated for each of the plurality of evaluation functions using a corresponding approximation technique. After generating a plurality of approximated functions, an Expected Calibration Error (ECE) value is computed based on the plurality of approximated functions. Finally, the ML model is calibrated based on the computed ECE value. For example, a plurality of parameters associated with the ML model to be calibrated are adjusted based on the ECE value. In the present disclosure, the ECE value is computed after temperature scaling and hence the calibration error or ECE is less which further increases the confidence in calibration.

Figure 1:
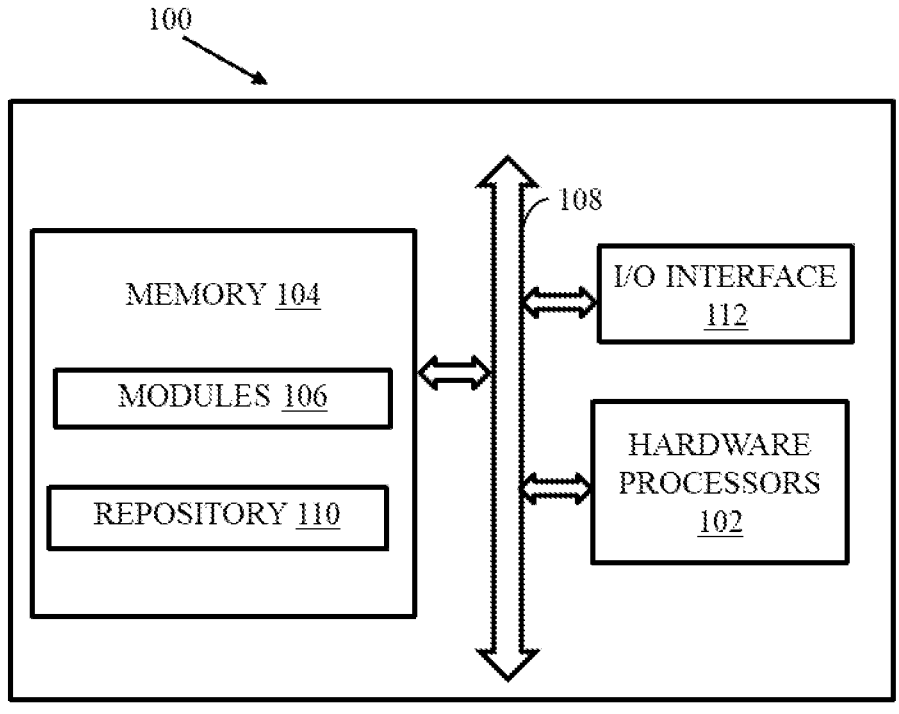
FIG. 1 is a functional block diagram of a system for calibrating Machine Learning (ML) models in Fully Homomorphic Encryption (FHE) applications, in accordance with some embodiments of the present disclosure.
Figure 3:
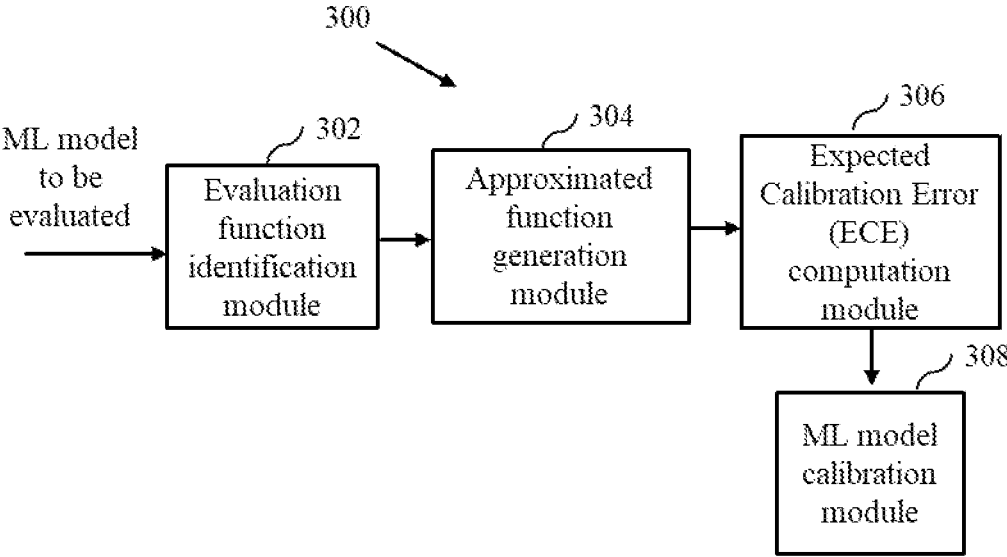
FIG. 3 illustrates a functional architecture of the system of FIG. 1, for calibrating ML models in FHE applications, in accordance with some embodiments of the present disclosure.

Referring now to the drawings, and more particularly to FIGS. 1 through 3, where similar reference characters denote corresponding features consistently throughout the figures, there are shown preferred embodiments and these embodiments are described in the context of the following exemplary system and/or method.

FIG. 1 is a functional block diagram for calibrating ML models in FHE applications, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases. For example, other devices comprises a plurality of sensors and a plurality of camera.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

The plurality of modules 106 include programs or coded instructions that supplement applications or functions performed by the system 100 for calibrating ML models in FHE applications. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 includes an evaluation function identification module (shown in FIG. 3), an approximated function generation module (shown in FIG. 3), an ECE computation module (shown in FIG. 3) and an ML model evaluation module (shown in FIG. 3). In an embodiment, FIG. 3 illustrates a functional architecture of the system of FIG. 1, for calibrating ML models in FHE applications, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 are explained with reference to the method steps depicted in FIG. 2 and the components are depicted in FIG. 3.

FIG. 2 is an exemplary flow diagram illustrating a method 200 for calibrating ML models in FHE applications implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive the ML model to be calibrated. The ML model to be calibrated belongs to one of a) unencrypted ML model trained with encrypted data b) encrypted ML model trained with encrypted data and c) encrypted ML model trained with unencrypted data. The dataset used for training the ML model includes textual data, tabular data, images and so on.

At step 204 of the method 200, the evaluation function identification module 302 executed by one or more hardware processors 102 is configured by the programmed instructions to identify the plurality of evaluation functions pertaining to the ML model to be calibrated using the pattern matching technique. For example, the pattern matching technique compares a plurality of functions associated with the ML model to be calibrated with a plurality of predefined functions for which the approximation is to be generated. The plurality of functions associated with the ML model to be calibrated which matches with the plurality of predefined functions are identified. In an embodiment, the plurality of predefined functions comprises a log loss function, an exponentiation function, a division by encrypted value function, a softmax function, a sign(x) function, an abs(x) function, a ReLU function, a minimum function, a maximum function, a line search function and a scalar function.

At step 206 of the method 200, the approximated function generation module 304 executed by the one or more hardware processors 102 is configured by the programmed instructions to generate the approximated function for each of the plurality of evaluation functions using the corresponding approximation technique. For example, the approximated functions include an approximated log loss function, an approximated exponentiation function, an approximated division by encrypted value function, an approximated softmax function, an approximated sign(x) function, an approximated abs(x) function, an approximated ReLU function, a minimum approximation function, a maximum approximation function, an approximated line search function and an approximated scalar function.

In an embodiment, the approximated log loss function is a Taylor series expansion corresponding to the log loss function. Equation (1) indicates the log loss function and the corresponding approximated log function of the equation (1) is given in equation (2). Now referring to equation (2), x can be either p or (1–p).

$$\log loss = -\sum (y * \log(p) + (1-y) * \log(1-p)) \tag{1}$$

$$approximated\log(x) = x - \frac{x^2}{2} + \frac{x^3}{3} - \frac{x^4}{4} + \frac{x^5}{5} - \frac{x^6}{6} \tag{2}$$

In an embodiment, the approximated exponentiation function $e^x$ is a Maclaurin series expansion of the corresponding exponentiation function as given in equation (3).

$$e^x = 1 + x + \frac{x^2}{2} + \frac{x^3}{6} + \frac{x^4}{24} + \frac{x^5}{120} \tag{3}$$

In an embodiment, the approximated division by encrypted value function is obtained by generating an inverse of a denominator value and further multiplying by a numerator value, wherein the inverse is obtained using a Newton iterative method. The Newton iterative method is used for generating approximated values for real valued functions.

In an embodiment, the approximated softmax function $e^{x_i}/\Sigma_{i=1}^{n}e^{x_i}$ is obtained by initially computing the approximated exponentiation for $e^x$ using a corresponding Maclaurin series expansion. Further, an exponential sum $\Sigma_{x=1}^{n}e^x$ is computed by adding of a plurality of exponentials. Further, an inverse of the exponential sum is computed using the Newton iterate method. Finally, the approximated softmax function is computed by multiplying the approximated exponentiation and the computed inverse. The approximated softmax function is given in equation (4).

$$\text{approximated softmax=approx}(e^x)\text{*newton\_iterate}$$
$$(\Sigma_{i=1}^{n}e^{x_i}) \tag{4}$$

In an embodiment, the approximated sign(x) function is computed by as follows. Initially, a maximum value between 'x' and '0' is obtained using max(x, 0) function, wherein 'x' is a non-zero element. Further, an inverse of x is computed using the Newton iterate method. Finally, the approximated sign(x) function is computed by multiplying the obtained maximum value and the computed inverse of x. The approximated sign(x) function is given in equation (5). Now referring to equation (5), max(x, 0) is the ReLU function on input 'x'. Hence max(x, 0) can be computed using ReLU_approx polynomial approximation.

$$\text{sign}(x)=\max(x,0)\text{*newton\_iterate\_inverse}(x)) \tag{5}$$

In an embodiment, the approximated abs(x) function given in equation (6) is obtained using a corresponding ReLU approximation of 'x'. In an embodiment, the ReLU approximation is obtained using the pseudocode 1 given in Table I. Now referring to Pseudocode 1, 'a', 'b' and 'c' are coefficients of the corresponding polynomial used for approximation. The resultant value or the approximated ReLU value is obtained using the expression $a+b*x+c*x^2$.

$$\text{abs}(x)=\text{ReLU\_approx}(x)+\text{ReLU\_approx}(x\text{*}-1) \tag{6}$$

TABLE I

| Pseudocode 1: ReLU_approx(x): | |
| --- | --- |
| 1. | x = x/7 |
| 2. | a = 0.125 |
| 3. | b = 0.5 |
| 4. | c = 0.25 |
| 5. | res = a + b*x + c*x$^2$ |
| 6. | return res*7 |

In an embodiment, the approximated minimum function associated with a first value 'x' and a second value 'y' is obtained as follows. Initially, a corresponding ReLU approximation is computed based on a first difference (x−y) and a second difference (y−x). Further, a ReLU approximation sum value is computed based on the first difference (x−y) and the second difference (y−x). Further, an inverse of the ReLU approximation sum value is generated using the Newton iterate method. After that, a first coefficient and a second coefficient is computed based on the first difference and the second difference. Finally, the minimum approximation function corresponding to the first value and the second value is obtained by adding a first multiplicated value and a second multiplicative value. The first multiplicative value is obtained based on the first coefficient and the first value. The second multiplicative value is obtained based on the second coefficient and the second value. In an embodiment, the pseudocode for generating the approximated minimum/maximum function is given in Table II and an example computation of minimum value using approximated maximum value is given in Table III.

TABLE II

| Pseudocode 2: Approximated minimum/maximum function | |
| --- | --- |
| 1. | z1 = ReLU_approx(y − x), |
| 2. | z2 = ReLU_approx(x − y) |
| 3. | z = z1 + z2 |
| 4. | z' = newton_iterate_inverse(z) |
| 5. | a = z1*z'; b = z2*z' |
| 6. | min = a*x + b*y for min // max = b*x + a*y for max |

TABLE III

| Example: Approximated minimum function | |
| --- | --- |
| 1. | min_approx(x, y): |
| 2. | min_approx(5, 2): |
| 3. | z1 = relu_approx(y − x) = 0, z2 = relu_approx(x − y) = 3 |
| 4. | z = z1 + z2 = 3 |
| 5. | z' = newton_iterate_inverse(z) = ⅓ |
| 6. | a = z1*z' = 0; b = z2*z' = 1 |
| 7. | min = a*x + b*y = 0*5 + 1*2 = 2 |

In an embodiment, the maximum approximation function is obtained by swapping the coefficients 'a' and 'b' associated with the minimum approximation function. For example, a max computation is given in Table IV. Now referring to Table IV, it is evident that the maximum value is obtained by swapping the coefficients at step 7

TABLE IV

| Example: Approximated maximum function | |
| --- | --- |
| 1. | max_approx(x, y): |
| 2. | max_approx(5, 2): |
| 3. | z1 = relu_approx(y − x) = 0, z2 = relu_approx(x − y) = 3 |
| 4. | z = z1 + z2 = 3 |
| 5. | z' = newton_iterate_inverse(z) = ⅓ |
| 6. | a = z1*z' = 0; b = z2*z' = 1 |
| 7. | max = b*x + a*y = 1*5 + 0*2 = 5 |

In an embodiment, the approximated line search function computes a loss function corresponding to each of a plurality of step sizes and selects a step size with minimum loss. The pseudocode 3 for line search function and the corresponding the approximated line search function (pseudocode 4) is given in Table V.

TABLE V

| Pseudocode 3: Line search function | Pseudocode 4: Approximated line search function |
| --- | --- |
| FUNCTION exact_line_search(fun, x, p): | line_search_approx( ) |
| | Initialize min = losses[0] |
| FUNCTION fx(alpha): | min_alpha = alpha_list[0] |

TABLE V-continued

| Pseudocode 3: Line search function | Pseudocode 4: Approximated line search function |
|---|---|
| ```
        return fun(x + alpha*p)
    alpha_list = [list of Alpha
values]
        losses = [Empty list]
    i = 0
        FOR 0 TO length(alpha_list):
            losses =
append_this_to_list(fx(alpha_list[i]))
            i = i + 1
        index =
index_of_min_loss(losses)
        return alpha_list[index]
ENDFUNCTION
``` | ```
For i = [1, ...
length(losses)−1]:
        i.        min, a, b =
                  min_approx(min,
                  losses[i])
        ii.       min_alpha = a *
                  min_alpha + b *
                  alpha_list[i]
return min_alpha
Example: Approximated line
search function
let losses be : 1 , −1, 3
alpha_list be: 2, 5, 6
min element in losses is −1, index
1
line search needs to return
alpha_list[1] = 5.
we initialize min=losses[0] = 1
min_aplha = alpha_list[0] = 2
for i = 1 :
    min, a, b =
min_approx(min, losses[i]) =
min_approx(1,−1)
    min, a, b = −1, 0, 1
    min_alpha = a*min_alpha
+ b*alpha_list[i] = 0*2 + 1*5 = 5
for i=2 :
    min, a, b =
min_approx(min, losses[i]) =
min_approx(−1, 3)
    min, a, b = −1, 1, 0
    min_alpha = a*mn_alpha +
b*alpha_list[i] = 1*5 + 0*6 = 5
``` |

Now referring to Table V, the main challenge is to compute the index_of_min_loss (Pseudocode 3). Losses are the list of loss values computed in the for loop of pseudocode 3. The corresponding approximated version is given in pseudocode 4 of Table V. As the values are encrypted and hence it is challenging to identify the minimum value. Now referring to pseudocode 4, it is required to find the index of minimum value in the losses list, and then return alpha_list [index]. Here, the min_approx function is modified in such a way that it not only returns min(x,y) but also the coefficients a, b. These coefficients are further used to compute the required (minimum) element from the alpha list. In an embodiment, the approximated scalar function is obtained based on the approximated sign(x) function and the approximated abs(x) function. In an embodiment, the approximated scalar function is generated using the pseudocode 5 given in Table V. Now referring to Table VI, the epsilon and bound values are initialized and passed into Scalar Function class. The Scalar Function class includes two main functionalities to provide for BFGS algorithm including a "Generating scalar function for a given x0−fun(X0)" and a "Returns approx. derivative for the updated scalar function−grad (X0)". In approx_derivative function Jacobian matrix is generated by calculating an absolute step from a relative step. In line 20 sign approximation and max approximation are used.

TABLE VI

Pseudocode 5: Approximated scalar function

```
1.    FUNCTION _prepare_scalar_function_approx(fun, x0):
2.        epsilon = eps
3.        bounds = (−infinity, +infinity) //make sure input is in the
      bounds
```

TABLE VI-continued

Pseudocode 5: Approximated scalar function

```
4.        sf = ScalarFunction(fun, x0, bounds) //evaluate the
      function
5.        return sf
6.    ENDFUNCTION
7.    CLASS ScalarFunction:
8.        FUNCTION fun(x0):
9.            return updated_function //evaluate the function after
      every update
10.       ENDFUNCTION
11.
12.       FUNCTION grad(x0):
13.           return approx_derivative(updated_function, x0) // get
      first order derivative to properly update in the next step
14.       ENDFUNCTION
15.   ENDCLASS
16.
17.   FUNCTION approx_derivative(fun, x0):
18.       rel_step = EPS**0.5
19.       f0 = [fun(x0)] //evaluate the current function value
20.       absolute_step (h) = rel_step * sign_x0 * max(1,
      abs(x0)) //absolute value approximation
21.       x = x0 + h[0]
22.       dx = x[0] − x0[0]
23.       df = fun(x) − f0
24.       J_transposed[0] = df * newton_iterate(dx) //completes
      the first order derivative computation
25.       return J_transposed
26.   ENDFUNCTION
```

At step 208 of the method 200, the ECE computation module 306 executed by the one or more hardware processors 102 is configured by the programmed instructions to compute the ECE value for the ML model based on a generated plurality of approximated functions using an approximated Broyden-Fletcher-Goldfarb-Shanno (BFGS) technique. The BFGS is a common technique used for computing the ECE value. However, generating an approximated BFGS capable of evaluating an encrypted ML model is a challenging task which is achieved by the present disclosure. In an embodiment, the approximated BFGS technique is obtained by replacing each of the plurality of evaluation functions associated with the BFGS with the corresponding approximated functions.

In an embodiment, the pseudocode 6 for the approximated BFGS is given in Table VII. Now referring to pseudocode 6, BFGS algorithm is used for Minimization of scalar function of one or more variables. It is obtained from the family of newton's method for second order optimization. In BFGS, both first order and second order approximations are leveraged which gives the information on decent direction (pk) and step size (alpha_k) respectively. Further, Hessian matrix (Hk) containing the second order information is iteratively calculated. Here, x(k) value is replaced with x(k+1) given that the new point x(k+1) is an optimal solution.

TABLE VII

Pseudocode 6: Approximated BFGS function

```
1.    FUNCTION minimize_bfgs( log_loss, x0)
2.        sf = prepare_scalar_function( log_loss, x0)
3.        f, fprime = sf.fun, sf.grad   //returns
      wrapped logloss function (sf.fun) and first order derivative
      of logloss (sf.grad) respectively
4.        old_fval, gfk = f(x0), fprime(x0)
5.        k, N, I = 0, length(x0), Identity_matrix(N x N)
6.        Hk = I
7.        xk = x0
8.        WHILE k < maxiter
9.            pk = −Hk * gfk //pk gives us the direction to travel
      along the slope
10.           alpha_k = exact_line_search(f, xk, pk)
11.           xkp1 = xk + alpha_k * pk
12.           gfkp1 = fprime(xkp1)
13.           sk = xkp1 − xk
14.           xk = xkp1
15.           IF gfkp1 = None
16.               THEN gfkp1 = myfprime(xkp1)
17.           ENDIF
18.           yk, gfk= gfkp1 − gfk, gfkp1
19.           k = k + 1
20.           rhok_inv = yk * sk
21.           rhok = newton_iterate(rhok_inv)
22.           A1 = I − sk[:] * yk[:] * rhok
23.           A2 = I − yk[:] * sk[:] * rhok
24.           Hk = A1 * ( Hk * A2) + (rhok * sk[:] * sk[:])
25.       ENDWHILE
26.       return xk
27.   ENDFUNCTION
28.   FUNCTION exact_line_search(wrapped_logloss, x, p):
29.       alpha_list = [list of Alpha values]
30.       losses = [Empty list]
31.       i = 0
32.       FOR 0 TO length(alpha_list):
33.           losses = append_this_to_list(wrapped_logloss(x +
      alpha_list[i] * p))
34.           i = i + 1
35.       index = index_of_min_loss(losses)
36.       return alpha_list[index]
37.   ENDFUNCTION
38.
39.   FUNCTION _prepare_scalar_function_approx(log_loss,
      x0):
40.       epsilon = eps
41.       bounds = (−infinite, +infinite) //make sure input is in the
      bounds
42.       sf = ScalarFunction(log_loss, x0, bounds) //evaluate
      the function
43.       return sf
44.   ENDFUNCTION
45.
46.   CLASS ScalarFunction:
47.       FUNCTION fun(x0):
```

TABLE VII-continued

Pseudocode 6: Approximated BFGS function

```
48.           return wrapped_logloss //wrappes our log_loss
      function
49.       ENDFUNCTION
50.
51.       FUNCTION grad(x0):
52.           return approx_derivative(wrapped_logloss, x0) // get
      first order derivative to properly update in the next step
53.       ENDFUNCTION
54.   ENDCLASS
55.
56.   FUNCTION approx_derivative(wrapped_logloss, x0):
57.       rel_step = EPS**0.5
58.       f0 = [wrapped_logloss(x0)] //evaluate the current
      function value
59.           absolute_step (h) = rel_step * sign_x0 * max(1,
      abs(x0)) //absolute value approximation
60.       x = x0 + h[0]
61.       dx = x[0] − x0[0]
62.       df = wrapped_logloss(x) − f0
63.       J_transposed[0] = df * newton_iterate(dx) //completes
      the first order derivative computation
64.       return J_transposed
65.   ENDFUNCTION
```

The ML model evaluation module 308 executed by the one or more hardware processors 102 is configured by the programmed instructions to evaluate the ML model based on the ECE value. The plurality of parameters associated with the input ML model are adjusted based on the ECE value.

In an embodiment, The present disclosure has been calibrated in a plurality of ML datasets such as text (Internet Movie database (IMDB) from Kaggle, which classifies sentiment as positive or negative based on user reviews), tabular data (adult data from UC Irvine ML repository, which predicts whether the income exceeds 50K per year based on census income data), images (For Images, we used Dogs vs Cats dataset from Kaggle, which classifies whether the image contains a dog or a cat) and the like.

In an embodiment, the ML model with IMDB dataset is trained and tested using 2500 samples in 5 epochs with a batch size of 256. The validation split is 0.25. Here, the binary cross entropy loss function and Adam optimizer are used. Further, the ML Model with adult data from UC Irvine ML repository is trained using 26048 samples and tested with 6512 samples. The logistic regression with maximum iteration 1000 is used for training and the accuracy was 79.28%. Further, the ML model with Dog and Cat image dataset is trained using 18697 samples in 20 epochs and tested with 6303 samples. Optimization is done using Stochastic Gradient Descent (SGD) optimizer and categorical cross entropy loss function is used.

The results obtained are inline or more accurate when compared the evaluation with ML models without encryption. For example, the ECE value obtained for FHE based ML models and the corresponding unencrypted ML models are shown in Table VIII. From Table VIII, it is evident that the present disclosure is scalable to a broader class of ML datasets.

TABLE VIII

| Use cases for ECE | | |
| --- | --- | --- |
| Dataset | Original | Encrypted |
| Text | 0.47 | 0.45 |
| Tabular | 0.411 | 0.42 |
| Images | 0.58 | 0.59 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of evaluating an encrypted ML model. The present disclosure generates approximated functions corresponding to the plurality of functions and the encrypted ML model is calibrated using the approximated plurality of functions. Further, the present disclosure helps in testing the performance resilience and robustness of the ML models in privacy preserving setting which is a vital thing in the present technology.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data;

identifying, by the one or more hardware processors, a plurality of evaluation functions pertaining to the ML model, to be calibrated, using a pattern matching technique;

generating, by the one or more hardware processors, an approximated function for each of the plurality of evaluation functions using a corresponding approximation technique;

computing, by the one or more hardware processors, an Expected Calibration Error (ECE) value for the ML model based on a generated plurality of approximated functions using an approximated Broyden-Fletcher-Goldfarb-Shanno (BFGS) technique; and calibrating, by the one or more hardware processors, the ML model based on the ECE value.

2. The processor implemented method of claim 1, wherein a plurality of approximated functions comprises an approximated log loss function, an approximated exponentiation function, an approximated division by encrypted value function, an approximated softmax function, an approximated sign(x) function, an approximated abs(x) function, an approximated ReLU function, an approximated minimum function, an approximated maximum function, an approximated line search function and an approximated scalar function.

3. The processor implemented method of claim 2, wherein the approximated log loss function is a Taylor series expansion corresponding to the log loss function, wherein the approximated exponentiation function is a Maclaurin series expansion of the corresponding exponentiation function, wherein the approximated division by encrypted value function is obtained by generating an inverse of a denominator value and further multiplying by a numerator value, wherein the inverse is obtained using a Newton iterate method.

4. The processor implemented method of claim 2, wherein the approximated softmax function is obtained by:
  computing the approximated exponentiation for numerator using a corresponding Maclaurin series expansion;
  computing an exponential sum by adding of a plurality of exponentials within a range;
  computing an inverse of the exponential sum using the Newton iterate method; and
  obtaining the approximated softmax function by multiplying the approximated exponentiation and the computed inverse.

5. The processor implemented method of claim 2, wherein the approximated abs(x) function is obtained using a corresponding ReLU approximation of 'x' and, wherein the ReLU approximation is obtained using a corresponding polynomial.

6. The processor implemented method of claim 2, wherein the approximated minimum function based on a first value 'x' and a second value 'y' is obtained by:
  computing a corresponding ReLU approximation for a first difference (x–y) and a second difference (y–x);
  computing an approximated ReLU sum value based on the approximated first difference and the approximated second difference;
  generating an inverse of the approximated ReLU sum value using the Newton iterate method;
  computing a first coefficient and a second coefficient based on the first difference and the second difference; and
  obtaining the approximated minimum function based on the first coefficient, the first value, the second coefficient and the second value.

7. The processor implemented method of claim 2, wherein the approximated sign(x) function is computed by:
  obtaining a maximum value between 'x' and zero using the approximated maximum function;
  computing an inverse of 'x' using the Newton iterate method; and obtaining the approximated sign(x) function by multiplying the obtained maximum value and the computed inverse of 'x'.

8. The processor implemented method of claim 2, wherein the approximated maximum function is obtained by reversing the first coefficient and the second coefficient associated with the minimum approximation function.

9. The processor implemented method of claim 1, wherein the approximated line search function computes a loss function corresponding to each of a plurality of step sizes using the approximated minimum function and selects a step size with minimum loss, wherein the approximated scalar function is obtained based on the approximated sign(x) function and the approximated abs(x) function and, wherein the approximated BFGS technique is obtained by replacing each of the plurality of evaluation functions associated with the BFGS with the corresponding approximated functions.

10. A system comprising:
  at least one memory storing programmed instructions; one or more Input/Output (I/O) interfaces; and one or more hardware processors operatively coupled to the at least one memory, wherein the one or more hardware processors are configured by the programmed instructions to:
  receive a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data;
  identify a plurality of evaluation functions pertaining to the ML model, to be calibrated, using a pattern matching technique;
  generate an approximated function for each of the plurality of evaluation functions using a corresponding approximation technique;
  compute an Expected Calibration Error (ECE) value for the ML model based on a generated plurality of approximated functions using an approximated Broyden-Fletcher-Goldfarb-Shanno (BFGS) technique; and
  calibrate the ML model based on the ECE value.

11. The system of claim 10, wherein a plurality of approximated functions comprises an approximated log loss function, an approximated exponentiation function, an approximated division by encrypted value function, an approximated softmax function, an approximated sign(x) function, an approximated abs(x) function, an approximated ReLU function, an approximated minimum function, an approximated maximum function, an approximated line search function and an approximated scalar function.

12. The system of claim 11, wherein the approximated log loss function is a Taylor series expansion corresponding to the log loss function, wherein the approximated exponentiation function is a Maclaurin series expansion of the corresponding exponentiation function, wherein the approximated division by encrypted value function is obtained by generating an inverse of a denominator value and further multiplying by a numerator value, wherein the inverse is obtained using a Newton iterate method.

13. The system of claim 11, wherein the approximated softmax function is obtained by:
  computing the approximated exponentiation for numerator using a corresponding Maclaurin series expansion;
  computing an exponential sum by adding of a plurality of exponentials within a range;
  computing an inverse of the exponential sum using the Newton iterate method; and
  obtaining the approximated softmax function by multiplying the approximated exponentiation and the computed inverse.

14. The system of claim 11, wherein the approximated abs(x) function is obtained using a corresponding ReLU approximation of 'x' and, wherein the ReLU approximation is obtained using a corresponding polynomial.

15. The system of claim 11, wherein the approximated minimum function based on a first value 'x' and a second value 'y' is obtained by:
  computing a corresponding ReLU approximation for a first difference (x–y) and a second difference (y–x);
  computing an approximated ReLU sum value based on the approximated first difference and the approximated second difference;
  generating an inverse of the approximated ReLU sum value using the Newton iterate method;
  computing a first coefficient and a second coefficient based on the first difference and the second difference; and
  obtaining the approximated minimum function based on the first coefficient, the first value, the second coefficient and the second value.

16. The system of claim 11, wherein the approximated sign(x) function is computed by:

obtaining a maximum value between 'x' and zero using the approximated maximum function;

computing an inverse of 'x' using the Newton iterate method; and obtaining the approximated sign(x) function by multiplying the obtained maximum value and the computed inverse of 'x'.

17. The system of claim 11, wherein the approximated maximum function is obtained by reversing the first coefficient and the second coefficient associated with the minimum approximation function.

18. The system of claim 10, wherein the approximated line search function computes a loss function corresponding to each of a plurality of step sizes using the approximated minimum function and selects a step size with minimum loss, wherein the approximated scalar function is obtained based on the approximated sign(x) function and the approximated abs(x) function and, wherein the approximated BFGS technique is obtained by replacing each of the plurality of evaluation functions associated with the BFGS with the corresponding approximated functions.

19. One or more non-transitory machine readable information storage mediums comprising one or more instructions which when executed by one or more hardware processors causes:

receiving a Machine Learning (ML) model to be calibrated, wherein the ML model to be calibrated belongs to one of a) unencrypted ML model trained with encrypted data b) encrypted ML model trained with encrypted data and c) encrypted ML model trained with unencrypted data;

identifying a plurality of evaluation functions pertaining to the ML model, to be calibrated, using a pattern matching technique;

generating an approximated function for each of the plurality of evaluation functions using a corresponding approximation technique;

computing an Expected Calibration Error (ECE) value for the ML model based on a generated plurality of approximated functions using an approximated Broyden-Fletcher-Goldfarb-Shanno (BFGS) technique; and calibrating the ML model based on the ECE value.

20. The one or more non-transitory machine readable information storage mediums of claim 19, wherein a plurality of approximated functions comprises an approximated log loss function, an approximated exponentiation function, an approximated division by encrypted value function, an approximated softmax function, an approximated sign(x) function, an approximated abs(x) function, an approximated ReLU function, an approximated minimum function, an approximated maximum function, an approximated line search function and an approximated scalar function.

* * * * *